May 8, 1945.  F. M. MEYERS  2,375,311
BOAT LAMP
Filed Nov. 6, 1942
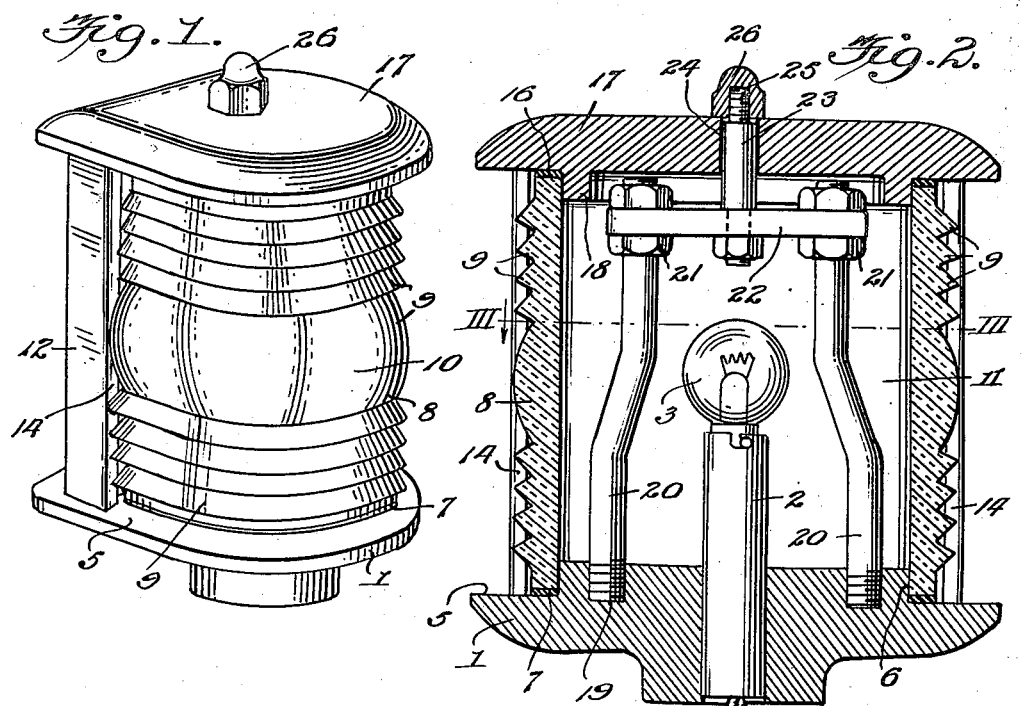
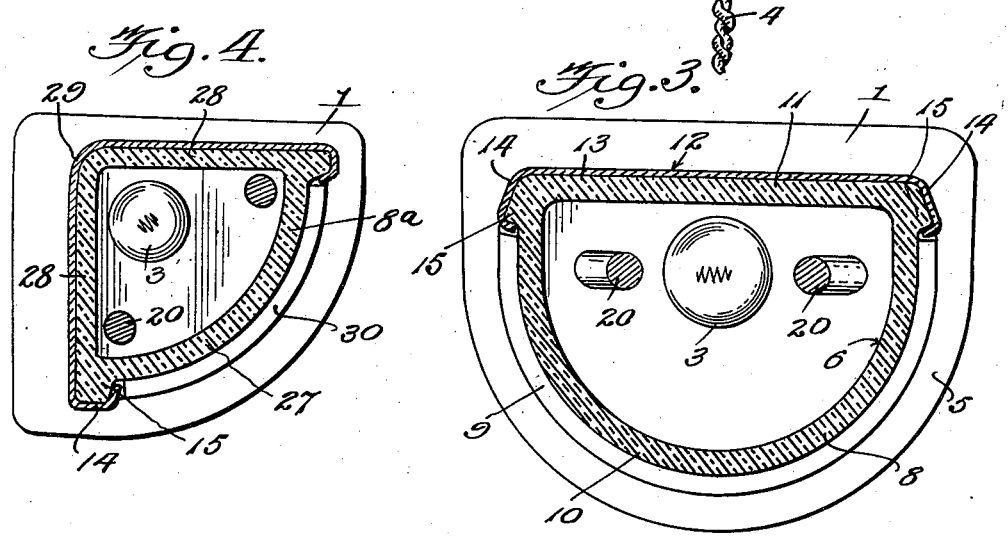
Inventor
Floyd M. Meyers
By W. S. M. Howell
Attorney Patented May 8, 1945

2,375,311

UNITED STATES PATENT OFFICE 2,375,311

BOAT LAMP

Floyd M. Meyers, Prospect, Ohio

Application November 6, 1942, Serial No. 464,704

3 Claims. (Cl. 240—7.5)

This invention relates to improvements in boat lamps, particularly signalling lamps of the type adapted for emitting colored light beams and thereby indicating the port or starboard sides of marine vessels.

An object of the invention is to provide a lamp of this category characterized by the simplicity and sturdiness of its mechanical design, high effectiveness as a signal-producing medium, manufacturing economy and long life.

Another object resides in the provision of a boat lamp comprising top and bottom plates between which is positioned a hollow lens of clear or colored glass, means being provided within the lens for joining the top and bottom plates and holding the same in compressive engagement with the opposite ends of the lens, the latter being of the Fresnel type and being formed with one or more planar sides with which is detachably connected in close-fitting engagement an opaque shield, so that light issuing from the lens may be projected in desired directions.

For further understanding of the invention, reference is to be had to the following description and the accompanying drawing, wherein:

Fig. 1 is a perspective view of a boat lamp formed in accordance with the present invention;

Fig. 2 is a vertical sectional view taken through the lamp;

Fig. 3 is a horizontal sectional view on the plane indicated by the line III—III of Fig. 2;

Fig. 4 is a similar view disclosing a modified type of lamp adapted for use as a side light on a boat or the like.

Referring more particularly to the drawing, particularly Figs. 1, 2 and 3, the lamp disclosed therein is adapted for use as a bow light, although, as shown in Fig. 4, the same may be modified for use as a side light on a boat. When used as a bow light, the lamp comprises a base member 1 which may take the form of a metallic casting. Axially, the base member is provided with an upstanding sleeve 2 formed at its upper end with a socket adapted for the reception of the base of an incandescent lamp bulb 3, the latter being energized by current conductors 4 which extend to a suitable source, not shown, of electrical energy. The upper portion of the base member 1 is provided with a horizontally extending peripherally disposed surface 5 which, inwardly, terminates in an upstanding shoulder 6.

The surface 5 and the shoulder 6 are shaped to receive a correspondingly formed gasket 7 on which is positioned the lower part of a hollow semicylindrical lens 8. This lens is formed from molded glass or other light-transmitting material, which is preferably clear when the lamp is used as a bow light, or colored red or green when the lamp is used as a side light. The lens is formed with Fresnel prisms 9 for the improved propagation of light therefrom in a well-understood manner, the light source 3 being disposed in substantially the principal axis of the lens.

When used as a bow light, the lens is substantially semicylindrical in horizontal cross section, as disclosed in Fig. 3, being formed with a curved or arcuate region 10 and a flat planar region 11. The flat side of the lens is disposed toward the rear of the boat on which the lamp may be mounted as a bow light, and to prevent the transmission of light in a rearward direction, I provide a close-fitting detachable light shield 12. This shield may be formed from such material as sheet metal having a body portion 13 which has close-fitting engagement with the flat side of the lens. The body portion of the shield terminates in flanges 14, which have slidable gripping engagement with enlargements 15 molded in the sides of the lens.

The open top of the lens engages with an upper gasket ring 16 which is disposed in engagement with a top member 17. The latter may be in the form of a metallic casting and is preferably provided with a depending flange 18, the outer surfaces of which act as a guide for the reception of the upper portion of the lens.

In order to hold the base and top members 1 and 17 together, and in compressive engagement with the lens 8, the base member 1 is provided with threaded sockets 19, in which are received the threaded lower ends of a pair of bolts 20. The upper ends of these bolts are threaded for the reception of nuts 21, which clampingly engage a cross bar 22. Carried by and extending upwardly from the central portion of the bar 22 is a bolt 23, the latter being received within an opening 24 provided in the top member 17 and having a threaded upper extension 25, which projects above the plane of the top member 17 and receives a clamping nut 26. When the latter is tightened, the base and top members 1 and 17 are joined together and held in compressive clamping engagement with the ends of the lens 8. It will be seen that this construction provides for simplicity and economy in the design and manufacture of the lamp forming the present invention, enabling all parts thereof to be accessible readily for repair or replacement purposes.

In the form of the invention disclosed in Fig. 4, the same features of construction are present, except that the lens is of quarter-circular form in horizontal cross section. The lamp depicted in Fig. 4 is adapted for use as a side light on boats, that is, to provide a colored signal for use during periods of darkness to indicate visually the port and starboard sides of a boat. Therefore, the lens 8a of the lamp shown in Fig. 4 is formed with a curved or segmental face 27 which extends through substantially 90° or more of a circle and is joined with a pair of flat or planar surfaces 28 arranged at right angles with respect to each other. These surfaces are covered by a detachable light transmitting shield 29 which functions in the same manner as the shield 12 in preventing the transmission of light through the flat or planar surfaces of the lens 8a. The latter is formed from a colored glass, either red or green, in order to produce a signalling means of definite coloration. The curved face of the lens 8a is provided with the Fresnel type of prisms 30 for the improved control of the light issuing from the lamp.

In view of the foregoing, it will be seen that the present invention provides an efficient and simplified signal-producing lamp for boats and the like. The lamp may be readily manufactured and assembled, and with the use of the detachable shields, the direction of light issuing therefrom may be controlled readily. It is obvious that the construction herein illustrated and described is subject to considerable modification without departing from the spirit and scope of the invention as the latter has been defined in the following claims.

I claim:

1. A marine lamp comprising top and bottom members, a one-piece tubular light-transmitting lens positioned between said members, said lens having curved and planar sides, a shield of opaque material detachably applied in close-fitting relationship to the planar side only of said lens to preclude light transmission therethrough, means positioned within said lens to unite said members in secured order and compressive engagement with the upper and lower end regions of said lens, and a light source disposed within said lens in substantially the plane of its principal axis.

2. A boat lamp comprising separable top and bottom members, a hollow one-piece light-transmitting lens positioned between said members, said lens being substantially quarter circular in horizontal cross section and formed to produce colored light beams, said lens having opposed curved and flat side walls, a shield of opaque material detachably applied in close-fitting engagement to the flat side of said lens to preclude light transmission therethrough, and securing means positioned within said lens for uniting said members in connected order and compressive engagement with the end regions of said lens.

3. A boat lamp comprising separable base and top members having opposed shouldered surfaces, an integral tubular light-transmitting lens arranged between said members in engagement with the shoulders thereof, threaded connecting means arranged within said lens for uniting said base and top members in secured order and compressive engagement with the end regions of said lens, the latter in horizontal cross section being formed to embody curved and flat sides, said curved side being formed with light refracting prisms, and an opaque light shield applied in close-fitting engagement to the planar side only of said lens and extending over substantially its full area.

FLOYD M. MEYERS.